Oct. 28, 1941.　　A. H. NEULAND　　2,260,859
HYDRAULIC TRANSMISSION
Filed Oct. 15, 1938　　5 Sheets-Sheet 1

WITNESS

INVENTOR
Alfons. H. Neuland

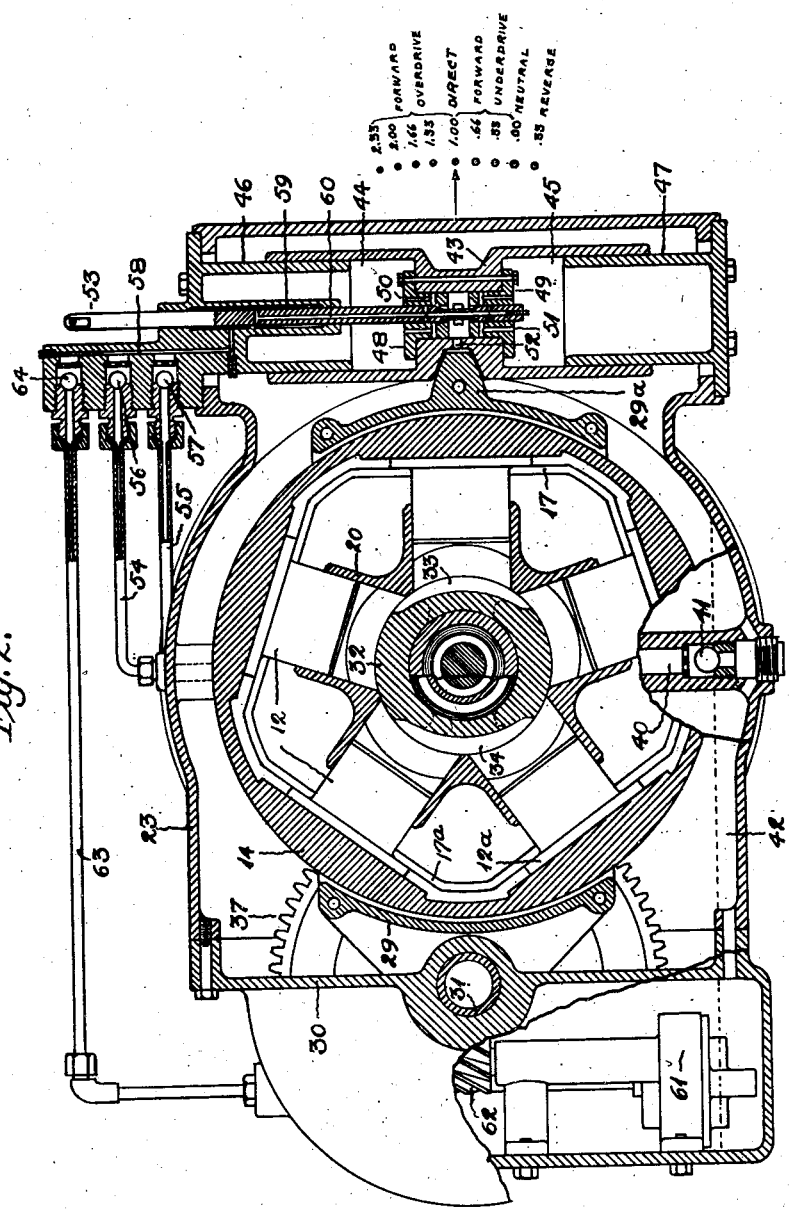

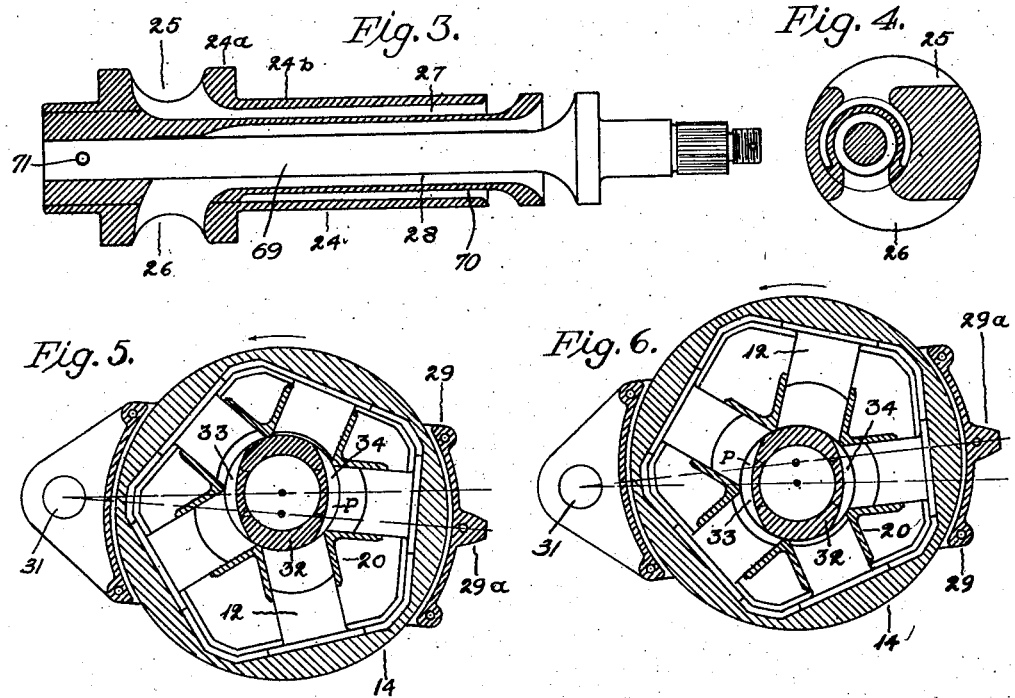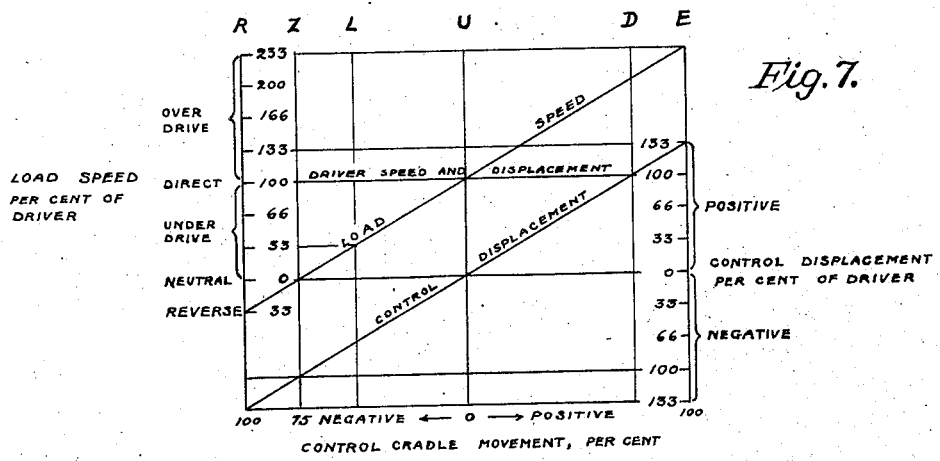

Oct. 28, 1941.  A. H. NEULAND  2,260,859

HYDRAULIC TRANSMISSION

Filed Oct. 15, 1938  5 Sheets-Sheet 4

WITNESS

INVENTOR

Oct. 28, 1941.  A. H. NEULAND  2,260,859
HYDRAULIC TRANSMISSION
Filed Oct. 15, 1938  5 Sheets-Sheet 5

WITNESS

INVENTOR

Patented Oct. 28, 1941

2,260,859

UNITED STATES PATENT OFFICE 2,260,859

HYDRAULIC TRANSMISSION

Alfons H. Neuland, Irvington, N. J.

Application October 15, 1938, Serial No. 235,286

15 Claims. (Cl. 60—53)

This invention relates to displacement devices and one of its principal objects is to provide a simple apparatus of this class for the efficient transmission of power between a prime mover and load capable of driving the load shaft under or over the speed of the prime mover or in forward or reverse directions, and to provide means for the easy control of the speed and torque relationship, and the direction of rotation of the load with respect to the prime mover.

My invention resides in an improved construction and arrangement of an apparatus for positively pumping a fluid or driving an element with the flow of a fluid under pressure; for the transfer of a major power portion directly and of a minor portion indirectly to the load with the aid of the fluid, and for varying the output or displacement of one unit with respect to another unit.

The foregoing and other objects and advantages of my invention will appear in the following description and the appended drawings showing a preferred and other embodiments of my invention and will hereinafter be more fully defined in the appended claims.

Fig. 2 is a cross sectional view of the transmission shown in Fig. 1, taken thru the control unit, with a portion at the bottom cut away to show the oil pump.

Figures 3 and 4 are a longitudinal section and a cross section of the inner fluid conducting element of the transmission in Fig. 1, showing a preferred construction and particularly the annular ducts and their connection with the ports and openings.

Figures 5 and 6 are diagrams of the control unit and cradle and illustrate the manner in which shifting of the cradle reverses the pressure and fluid flow.

Fig. 7 is a graph illustrating the change in relative speed and direction between prime mover and load that results from a relative change in displacement.

Figure 1:
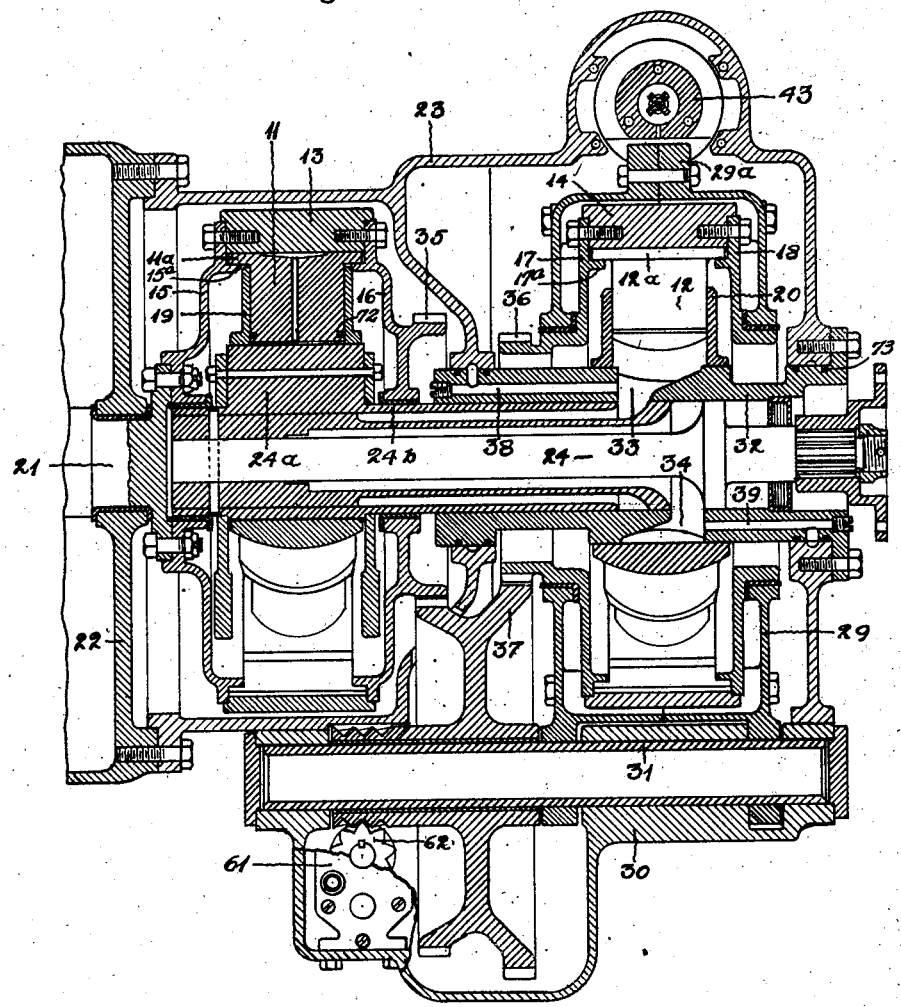
Fig. 1 is a horizontal section thru a fluid transmission embodying my invention with a portion at the bottom cut away to show an auxiliary oil pump.

For the purpose of illustrating how my invention is carried into effect I have shown in the accompanying drawings, several arrangements or embodiments forming complete transmissions, each consisting of a driving and a controlling displacement unit and associated parts. In the figures like numerals refer to like or similar parts. Referring to the figures and particularly to Figs. 1 and 2, each unit includes a plurality of displacement elements 11, 12. In the present instance there are five of these elements in each unit shaped to form pistons having shoulders 11a, 12a at one of their ends and flat working surfaces slidingly associated with working surfaces within the inner periphery of the annular outer elements or rings 13, 14. One ring is provided with bearing brackets 15, 16 and the other with bearing brackets 17 and 18 bolted to their faces and shaped to form shoulders 15a and 17a engaging with the shoulders on the pistons and adapted to permit the pistons to slide along the working surface and to maintain contact with the respective rings. Each unit is provided with a second outer element or ring 19, 20 which will hereinafter also be referred to as the intermediate element having a plurality of evenly spaced radially disposed cylinder bores associated with said pistons.

One of the outer elements of the driving unit, in this instance the elements 13, is provided with driving means, which may comprise part of an engine shaft 21 bolted to the bracket 15 and journalled within the engine block 22 to which the transmission casing 23 may be directly bolted. I provide a rotatable inner or fluid conducting element 24 having an eccentric portion 24a operatively fitted within the cylinder element 19 of the driving unit, a concentric extension on one side journalled within the bracket 15 and a concentric extension 24b on the other side journalled within the bearing bracket 16 and extending beyond the bracket thru the control unit. The eccentric portion of the inner element is provided with inlet and outlet ports 25, 26 shown in Figs. 3 and 4, which connect with annular ducts 27 and 28 in the concentric portion 24b. The inner element may preferably be formed as shown in Figs. 3 and 4 and consist of an outer sleeve like portion 24, a central shaft 69 and an intermediate sleeve 70 secured to one another by some means such as the pin 71, or by welding to form a unit. It is seen that when the engine shaft is rotated with respect to the inner shaft, the outer elements rotate in synchronism but on axis displaced one from the other. This causes the pistons to be withdrawn from the cylinders during one half of each revolution and to draw fluid into the cylinders as they register with the inlet port 25. As each cylinder approaches the end of its outward stroke the inlet port closes and as the piston commences its return stroke, the outlet port opens and remains open until substantially the end of the inward stroke is reached. Even with the arrangement shown having only five cylinders a substantially unvarying fluid flow and pressure may be produced as there are at all times not less than two cylinders facing each port. It should be noted that the flat working surfaces of the pistons remain at all times parallel to those on the outer element, regardless of the displacement between the centers of rotation of the outer elements.

I provide a cradle 29 within which the outer element 14 of the control unit is journaled. The cradle is preferably made in two parts bolted together as shown, is provided with a tooth shaped projection 29a at one point of its circumference and is preferably pivoted to the cover portion 30 of the casing by the pivot pin or shaft 31 at an opposite point of its circumference. I further provide an annular sleeve shaped stationary element 32 extending thru the control unit and rigidly supported, preferably at both ends, within bores of the casing and secured thereto at one end by some means such as the bolts shown in the drawings. The sleeve 32 is operatively associated with the cylinder ring 20 and fluid conducting element 24 and is provided with ducts 33 and 34 which terminate in inlet and outlet ports and serve to conduct fluid therebetween.

With the above described arrangement the axis of rotation of cylinder ring 20 is held in a fixed position by the sleeve 32 while the rotational axis of the element 14 is dependent upon the position of the cradle 29 and can be shifted between the extremes shown in Figs. 5 and 6. When the cradle is in the position shown in Fig. 5 and the outer element cradled therein is rotated in the direction shown by the arrow, fluid is forced into the duct 34. As the cradle, in Fig. 5 is shifted upward the axis of rotation of the outer elements are moved closer toward one another and the displacement of the control unit is progressively reduced and reaches zero when the two axes of rotation coincide. A further movement of the cradle in the same direction causes the axis of element 14 to shift to the other side of the rotational axis of element 20 and the pistons are again made to reciprocate and to produce a progressively increasing displacement as the cradle reaches the extreme position shown in Fig. 6 but the pressure developed has now shifted to the port 33 at the left of the figure and the fluid flow thru the ducts has been reversed.

The outer elements in each unit, as heretofore stated rotate in synchronism with one another. I also provide means for operatively connecting one of the outer elements of one unit with an outer element of the other unit. In the embodiment shown in Fig. 1 this operative connection is accomplished by gear wheels 35 and 36, which may be formed separately from, but in the drawings are shown as formed integral with, the brackets 16, 17 meshing with a gear wheel 37, aligned with and arranged to rotate concentric with the cradle pivot or shaft 31 in order to maintain a fixed center distance between associated gears regardless of the position of the cradle. For reasons which will hereafter be more fully described the gear wheel 35 associated with the driving unit is made larger than the gear wheel associated with the control unit for the purpose of rotating the outer elements of the control unit at a speed exceeding that of the driving unit. With this arrangement it is possible to use pistons of the same size for both units and at the same time secure a greater output or displacement from the control unit with respect to that of the driving unit and so secure reverse operation of the load shaft. In Fig. 1, the output of the control unit exceeds that of the driving unit by one third, with which a reverse load speed approximately one third that of the engine speed may be obtained. With my device power may be transmitted from the shaft or inner element 24 to the engine shaft, but the illustrated embodiment is particularly adapted for transmitting power from an engine shaft, such as the shaft 21 to the inner rotatable element or shaft 24 which latter, in this instance, constitutes the load shaft.

The operation of the device may best be understood from the grasp in Fig. 7 illustrating the relationship between the speeds of the driving and driven elements with various positions of the cradle. The engine shaft speed and displacement of the driving unit are assumed to be constant, and are identified by the horizontal line intersecting the 100 per cent mark, while the load speed and the displacement of the control unit are represented by the diagonal lines. If the displacement of the control unit is adjusted so that it equals the displacement of the driving unit and so that the control unit operates as a motor, no torque will be exerted on the load shaft and the load shaft will remain stationary. This condition is shown at the point Z which corresponds to a cradle movement equal to 75 per cent of its total negative movement. As the cradle is moved to 50 per cent of its total negative movement the conditions indicated by intersections of the line L are established showing that the load shaft has been forced to accelerate and operates at 33 per cent, or one third the speed of the driver. The load torque at this point is three times that of the engine torque and as the cradle reaches the position shown in Fig. 2 the displacement of the control unit has progressively decreased and ceased all together. This condition is represented by the line U in the diagram showing that the speed of load and engine are now the same. At this point the load torque is substantially equal to the engine torque, the fluid flow has ceased and substantially the entire engine power is directly transmitted to the load. A further movement of the cradle in the same direction reverses the fluid flow between the units. The control unit now acts as a pump, supplies fluid to the driving unit and forces the load shaft to rotate at a speed exceeding that of the engine. The cradle movement may be adjusted so as to obtain any over-speed desired. It may progressively be moved to the point D where its displacement equals that of the driving unit for a load speed twice that of the engine or it may be moved to its extreme position E for a load speed two and one third times that of the engine shaft. During under drive, torque to the outer elements of the driving unit flows from two sources, directly from the engine and indirectly from the stationary element 32 which latter acts as a fulcrum for the outer elements of the control unit, causes them to operate as motor elements and thru the gearing transmit their torque to said outer elements of the driving unit. When over driving, only a part of the engine torque is directly transmitted to the load shaft, the remainder being supplied to the control unit, thru the gearing, which converts this engine power into a flow of fluid under pressure, causes the driving unit to operate as a motor and to supply the overspeed component.

As heretofore stated, my transmission is capable of driving the load shaft in reverse direction. This is accomplished by shifting the cradle 29 back to the position Z representing zero load speed and beyond this point to the point R, under which condition the displacement of the control unit is one third greater than that of the driving unit. This forces the driving unit to develop a relative speed between its driving and driven elements of one and one third times that of the engine and as the engine speed is unity the load shaft is forced to rotate at one third engine speed in reverse direction. During reverse operation the driving unit operates as a motor and the load shaft exerts a torque on its outer elements in direction of engine rotation. The entire engine torque as well as the torque from the outer elements of the drive unit combine and thru the gearing flow into the outer elements of the control unit, driving it as a pump, the stationary element 32 serving as a fulcrum.

When the transmission is used in installations where the load has considerable inertia, as in motor vehicles, it may operate as a brake whenever the load is in motion and the engine throttle is closed. The load now drives the engine at substantially the same relative speed for any given adjustment of the control cradle.

From the foregoing it will be seen that my device transmits power efficiently. Whenever the load speed equals the driver speed there is substantially no flow of fluid thru the units and no relative movement between the elements of the drive unit. The drive unit merely operates as a clutch and develops sufficient pressure in its cylinders to transmit the engine torque directly to the load, and since the axis of rotation of the outer elements in the control unit coincide during this stage of operation, there is in this unit also no relative motion between pistons and cylinders. The losses, at this time, are substantially those due to friction between the rotating parts and the stationary element 32, and friction in the bearings and gearing. When the driver and driven shafts are operated at a speed difference there is an additional loss due to friction of the reciprocating pistons and the flow of fluid thru the units. However since the load shaft in my transmission is capable of operating above or below synchronism, that is the speed of the driver, its speed may be varied within wide limits with only moderate fluid velocity and losses. The moderate fluid velocity losses in my device are also due to the arrangement of cylinders, pistons and other parts and their construction, permitting the use of large ports and ducts and an easy flow of fluid through the units. In this connection it should be noted that my construction of the element 24 providing annular fluid ducts is of importance in reducing losses as it permits fluid from one of the stationary ports 33, 34 to flow circumferentially and without obstruction to one of the rotating ports 25, 26 as these change their circumferential position with respect to the stationary ports.

Pressure developed by the units causes a portion of the fluid to leak thru the operating surfaces and to collect at the bottom of the casing. In order to replenish this loss the stationary member is provided with ducts 38, 39. The duct 38 registers with the hole 40 in the casing, shown in Fig. 2, within which a ball check valve 41 is arranged opening into the oil reservoir 42 at the bottom of the casing. The duct 39 likewise registers with a hole in the casing which connects it with the oil reservoir thru a check valve (not shown) identically the same as the valve 41. During operation the pressure in one of the ducts keeps its ball check closed and the vacuum in the other duct opens its ball check and draws oil from the reservoir into the units. Whenever the pressure and vacuum reverse, the last mentioned check valve closes and the first mentioned valve opens, insuring an uninterrupted flow of oil into the units under all conditions of operation. Fluid leakage may be reduced by providing rings 72 and 73 for the pistons and the stationary member 32 respectively as shown in Fig. 1.

It will be noted that whenever the control unit is subjected to torque, such torque reacts upon the cradle and tends to move it into a position of reduced torque. While the cradle may be shifted into, or held in, the desired position by any suitable or well known means, my invention includes means for shifting the cradle into various positions with but little effort on the part of the operator. The particular means shown in the drawings consists of a movable cylinder element 43 provided at both ends with cylinder bores 44 and 45 into which the piston elements 46 and 47 are fitted with their ends bolted to the casing 23. The cylinder element is notched to engage with the tooth shaped projection 29a on the cradle and is bored out to receive the plugs 48, 49. The plugs are provided with ducts 50, 51 and form a central space from which oil is returned to the casing reservoir thru the hole 52. A control rod 53 is fitted within a central hole in the upper piston and extends thru the plugs 48, 49. Oil under pressure for operating the control cylinder is supplied by the transmission from the ducts 38 or 39 in the casing and thru the oil lines 54 and 55 and check valves 56 or 57 to a common duct 58 and to an oil chamber 59 formed by an enlargement in the bore of the upper piston. The chamber is at all times connected with the central duct 60 in the control rod regardless of the position of the rod. Assuming that the cradle and cylinder are in position for direct drive as shown in Fig. 2, a downward movement of the control rod 53 causes the duct 50 in plug 48 to register with a radial hole in the rod and to conduct oil into cylinder 44. At the same time the duct 51 in plug 49 registers with a groove in the central outer portion of the rod and permits oil from cylinder 45 to escape into the casing. The cylinder follows the movement of the control rod in either direction and comes to a stop or maintains any new position in response to it. I also provide means for operating the control when the device is not transmitting power, which consists of an auxiliary oil pump 61 preferably driven by a worm wheel 62 meshing with teeth on an extension of the gear wheel 37 and connected with the control piston duct 58 thru an oil line 63 and check valve 64. The oil under pressure thus supplied to the duct 58 thru one of the oil lines keeps the ball checks of the other valves in a closed position.

It will be apparent that when a fluid such as oil is used as the transmitting medium, the inner and outer elements are inherently self lubricated because of pressure developed by the units, which forces oil into all working clearances. The bearings may also be supplied with oil from the transmission or from the auxiliary pump in an obvious manner, not shown.

Figure 8:
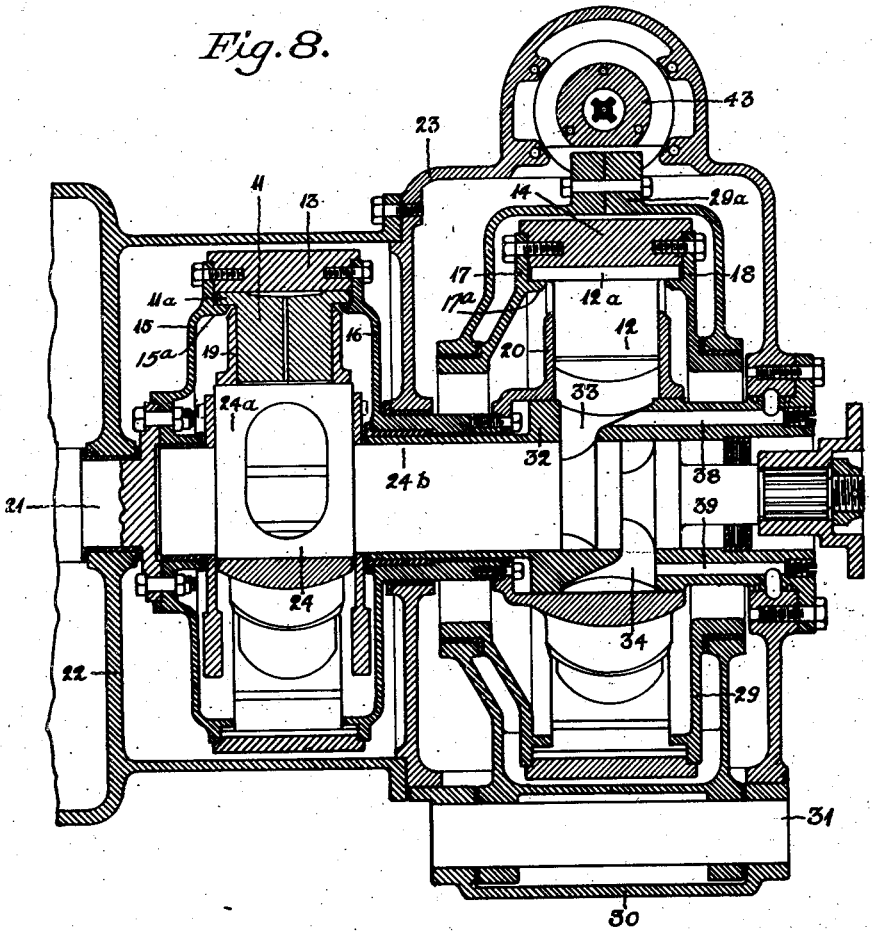
Fig. 8 is an axial sectional view of a modified embodiment of my invention in which mechanical power between the units is transferred directly instead of by the gearing shown in Fig. 1.

In Fig. 8 I have shown a simplified embodiment of my invention in which I provide a direct operative connection between the driving and control units. This is accomplished by directly connecting the outer element 13 of the driving unit with the intermediate element 20 of the control unit, by some suitable means such as a plurality of bolts, and transferring torque to the element 14 thru the pistons 12 associated with the ring 20. When the device is used with an internal combustion engine, the outer elements of both units, rotating as a single mass, serve as an effective flywheel for the engine and permit a saving in the weight of the installation. I further provide a control unit having a substantially larger displacement per revolution with respect to that of the driving unit. Only with such an arrangement is it possible or practicable to secure reverse operation of the load shaft. The transmission shown in Fig. 8 has a control unit with an output one third greater compared with the output of the driving unit suitable for operating the load shaft in reverse direction at one third engine speed and with a torque substantially three times that of the engine. In other respects this embodiment is similar to and operates as the transmission heretofore described and shown in Fig. 1.

Figure 9:
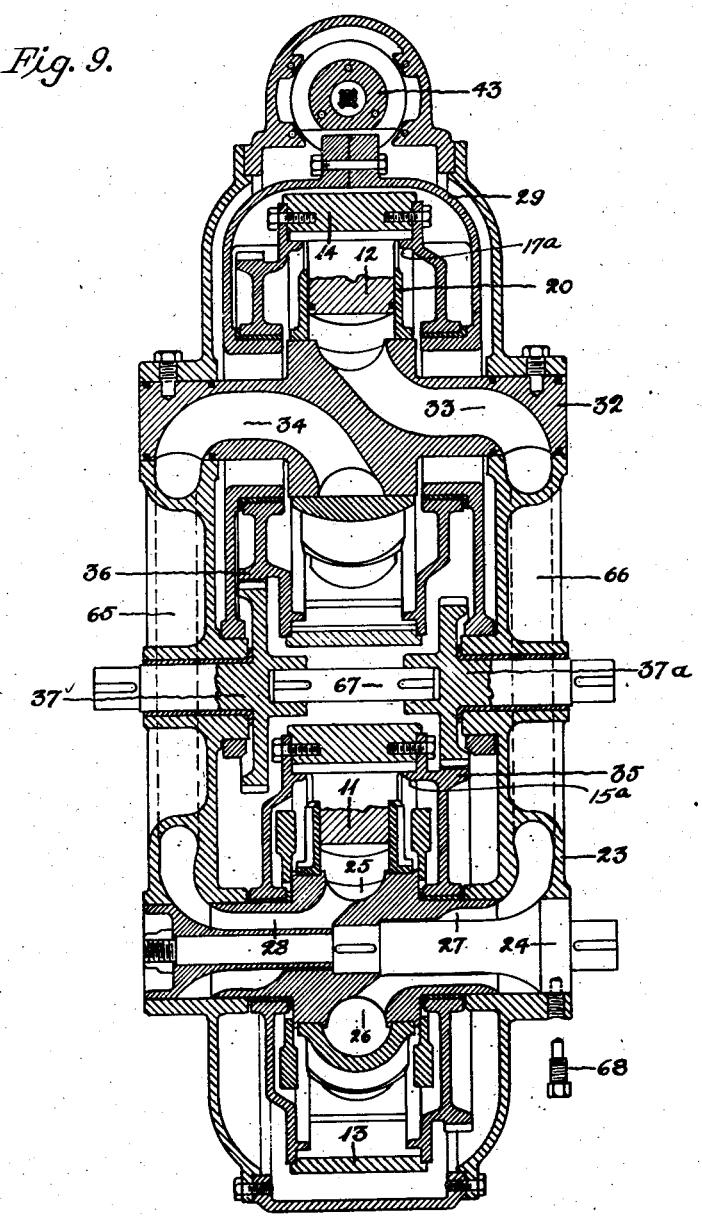
Fig. 9 is an axial sectional view of another embodiment of my invention in which the units are arranged side by side instead of end to end as in the other embodiments.

In the embodiment shown in Fig. 9 the driving and control units are arranged side by side, are operatively connected with one another by the gears 35, 36 and gear wheels 37, 37a. Power is transmitted between the inner element 24 and one of the gear shafts 37, 37a. In this embodiment the shaft 37, 37a takes the place of shaft 21 in Figs. 1 and 8 and the operation of the device is substantially the same as described in connection with Figs. 1 and 8. The inner element 24 is provided with sleeve like extensions forming annular ducts on both sides of its ports; the stationary fulcrum member 32 is shaped as shown and locked within the casing, and ducts 65, 66 in the casing serve to conduct fluid between the units. The gears 35, 36 and 37, 37a are proportioned so that the output of the control unit exceeds that of the driving unit, in order to operate the load shaft in reverse direction. The cradle pivot also is aligned concentric with the axis of rotation of gear wheels 37, 37a so as to maintain a fixed center distance between gears 36 and 37 regardless of the position of cradle 29. As heretofore mentioned the operation of this embodiment is similar to the operation described in connection with Fig. 1; however this embodiment may be operated in a modified manner. This is accomplished by removing the stub shaft 67 and locking the inner element 24 against rotation by means of the lock screw 68. There is now no operative mechanical connection between the units but only between the gears 36, 37 and between the gears 35 and 37a. If the gear shaft 37 is now driven by a power source the control unit is made to operate as a pump and the driving unit is made to operate as a fluid motor and to deliver its power to the shaft 37a. The load shaft may be operated in forward or reverse direction by merely reversing the direction of the fluid flow, and this may be accomplished by shifting the cradle 29 to one or the other side of the rotational axis of cylinder element 20, as heretofore described.

It should be noted that various changes may be made in the details of construction and combination of the various parts of my transmission and one or more of the features disclosed herein may be used in the present or other embodiments without departing from the spirit of my invention, and I desire to cover by my claims such changes and other embodiments which may reasonably be included within the scope of my invention.

I claim as my invention:

1. In a fluid transmission device, a constant displacement unit and a variable displacement second unit each provided with a pair of annular outer elements adapted to rotate in synchronism, one element in each pair forming a group of cylinders and the other provided with a plurality of pistons adapted to reciprocate within said cylinders, a relatively rotatable fluid conducting inner element having a concentric portion rotatively associated with one of the outer elements of the first unit and an eccentric portion associated with the other outer element of the first unit, a stationary cylindrical fulcrum element interposed between and associated with said inner element and one of the outer elements of said second unit for conducting fluid between said units, means for operatively connecting one of the outer elements of the first unit with one of the outer elements of the second unit, and means including a cradle for shifting the axis of rotation of one outer element of the second unit with respect to that of the other.

2. In a fluid transmission device, a constant displacement unit and a variable displacement second unit each provided with a pair of annular outer elements adapted to rotate in synchronism, one element in each pair forming a group of radially disposed cylinders and the other provided with a plurality of pistons adapted to reciprocate within said cylinders, a relatively rotatable fluid conducting inner element having an axial extension journaled concentric within one of the elements of the first unit and having an eccentric portion operatively associated with the other element of said first unit, a stationary cylindrical fulcrum element operatively interposed between and associated with said inner element and one outer element of said second unit for conducting fluid between said units, a casing for enclosing both units associated with said fulcrum element, a bearing adapted to align said axial extension and the free end of said fulcrum element with said housing, means for operatively connecting one of the outer elements of the first unit with one of the outer elements of said second unit, and means including a cradle for shifting the axis of rotation of one of the outer elements of the second unit with respect to that of the other.

3. In a fluid transmission device, a constant displacement unit, a variable displacement second unit each provided with a pair of annular outer elements adapted to rotate in synchronism, one element in each pair forming a group of radially disposed cylinders and the other provided with a plurality of pistons adapted to reciprocate within said cylinders, a relatively rotatable fluid conducting inner element having an axial extension journaled concentric with one of the elements of the first unit and an eccentric portion operatively associated with the other element of said first unit, a stationary cylindrical fulcrum element operatively interposed between and associated with said inner element and one outer element of said second unit for conducting fluid between said units, a casing enclosing the units including means for holding both ends of said fulcrum element in alignment with said first unit, means including a pivoted cradle for one of the outer elements of the second unit adapted to shift its axis of rotation with respect to that of the other, and means for connecting one of the outer elements of the first unit with one of the outer elements of the second unit including a gear wheel associated with one of the outer elements in each unit and having its axis of rotation aligned with the pivot axis of said cradle.

4. In a fluid transmission device, a constant displacement unit, a variable displacement second unit each provided with a pair of annular outer elements adapted to rotate in synchronism, one element in each pair forming a group of radially disposed cylinders and the other provided with a plurality of pistons adapted to reciprocate within said cylinders, a relatively rotatable fluid conducting inner element having an axial extension journaled concentric with one of the elements of the first unit and an eccentric portion operatively associated with the other element of said first unit, a stationary cylindrical fulcrum element operatively interposed between and associated with said inner element and one outer element of said second unit for conducting fluid between said units, a casing enclosing the units associated with said fulcrum element, means for operatively connecting one of the outer elements of the first unit with one of the outer elements of said second unit, means including a cradle for one of the outer elements of the second unit adapted to shift its axis of rotation with respect to that of the other element, cylinder and piston control elements, one associated with said cradle and the other with said casing, and means for shifting said cradle to various positions with a fluid supplied to said control cylinder under pressure.

5. In a fluid transmission device, a driving displacement unit including a pair of relatively rotatable shafts, a variable displacement second unit provided with a plurality of displacement elements and a pair of annular outer elements adapted to rotate synchronously but on axes displaced one from the other and to reciprocate said displacement elements with respect to one of said outer elements, stationary means associated with both units adapted to conduct fluid between said units, means for operatively connecting one shaft of said first unit with one of the outer elements of said second unit, a cradle for one of the outer elements of said second unit for displacing its axis of rotation with respect to the axis of rotation of the other element, a control element and power means for shifting said cradle in response to movement of the control element.

6. In a fluid transmission device, a driving displacement unit including a pair of relatively rotatable shafts, a variable displacement second unit provided with a plurality of displacement elements and a pair of annular outer elements adapted to rotate synchronously but on axes displaced one with respect to the other and to reciprocate said displacement elements with respect to one of said outer elements, stationary means associated with both units adapted to conduct fluid between said units and to serve as a fulcrum for said second unit, a pivoted cradle for one of the outer elements of said second unit for displacing its axis of rotation with respect to the axis of rotation of the other element, and means for operatively connecting one shaft of said first unit with an outer element of said second unit including a gear wheel for said cradled element engaging with a second gear wheel aligned concentric with the pivot axis.

7. In a fluid transmission device, a driving displacement unit including outer and intermediate synchronously rotatable elements and an inner fluid conducting element relatively rotatable with respect to said other elements and provided with a pair of axially extending fluid ducts having one of their ends terminating in ports facing said intermediate element and their other ends terminating in outwardly facing openings, a second displacement unit including outer and intermediate synchronously rotatable elements and a stationary cylindrical fulcrum element having radial ports registering with the openings in said fluid conducting element of the first unit and adapted to conduct fluid between the units, and means for maintaining rigid operative alignment between the outer element of the first unit and the intermediate element of the second unit including a bearing arranged between said units.

8. In a fluid transmission device, a driving displacement unit including outer and intermediate synchronously rotatable elements and an inner fluid conducting element relatively rotatable with respect to said other elements and provided with a pair of axially extending fluid ducts having one of their ends terminating in ports facing said intermediate element and their other ends terminating in outwardly facing openings, a variable displacement second unit also including outer and intermediate synchronously rotatable elements, stationary fluid conducting fulcrum means provided with ducts registering with said openings in said relatively rotatable fluid conducting element, means for operatively connecting the synchronously rotating elements in one unit with the synchronously rotating elements in the other unit, and means including a cradle for shifting the axis of rotation of the outer element of the second unit.

9. In a fluid transmission device, a constant displacement unit having an outer element and an intermediate element adapted to rotate synchronously, but on axes displaced one from the other and including a rotatable inner fluid conducting element, a variable displacement unit having an outer element and an intermediate element also adapted to rotate synchronously but on axes displaceable one from the other and including a stationary casing associated with said units adapted to provide a fixed rotational axis for the outer element of the constant displacement unit and to provide a fixed rotational axis for the intermediate element of the variable displacement unit, and a driving connection between the units.

10. In a fluid transmission device, a constant displacement unit having an outer element and an intermediate element adapted to rotate synchronously but on axes displaced one from the other and including a rotatable inner fluid conducting element, a variable displacement unit having an outer element and an intermediate element also adapted to rotate synchronously but on axes displaceable one from the other and including a stationary fluid conducting element, a stationary casing associated with said units adapted to provide a fixed rotational axis and a rigid support for both ends of the outer element of the constant displacement unit and to provide a fixed rotational axis and a rigid support for both ends of the intermediate element of the variable displacement unit, and a driving connection between the units.

11. In a fluid transmission device, a constant displacement unit having an outer element and an intermediate element adapted to rotate synchronously but on axes displaced one from the other and including a rotatable fluid conducting element, a variable displacement unit having an outer element and an intermediate element also adapted to rotate synchronously but on axes displaceable one from the other and including a cradle for supporting both ends of the outer element of said variable displacement unit and a stationary annular fluid conducting element extending beyond both ends of said cradle, a stationary casing associated with said units adapted to provide a fixed rotational axis and a rigid support for both ends of the outer element of the constant displacement unit, to provide a rigid support for both ends of said stationary fluid conducting element and a fixed rotational axis for the intermediate element of the variable displacement unit and to provide means for pivoting both sides of said cradle to permit displacement of the rotational axis of said outer element within said cradle, and a driving connection between the units.

12. In a fluid transmission device, a constant displacement unit having an outer element and an intermediate element adapted to rotate synchronously but on axes displaced one from the other and including a rotatable fluid conducting element, a variable displacement unit having an outer element and an intermediate element also adapted to rotate synchronously but on axes displaceable one from the other and including a cradle for supporting both ends of the outer element of said variable displacement unit and a stationary annular fluid conducting element extending beyond both ends of said cradle, a stationary casing associated with said units adapted to axially align the outer element of the constant displacement unit with the intermediate element of the variable displacement unit and to provide a rigid support for both ends of the outer element of said constant displacement unit and for both ends of said stationary fluid conducting element and further adapted to provide means for pivoting both sides of said cradle to permit displacement of the rotational axis of said outer element within said cradle, and coupling means for connecting the outer element of said constant displacement unit with the intermediate element of said variable displacement unit.

13. In a fluid transmission device, a constant displacement unit having a pair of synchronously rotatable outer and intermediate elements, a variable displacement unit having a pair of synchronously rotatable outer and intermediate elements, said units including a rotatable fluid conducting element, a stationary fluid conducting element and a housing adapted to align the rotational axis of the outer element of the constant displacement unit with the rotational axis of the intermediate element of the variable displacement unit, and a driving connection between the two last mentioned elements.

14. In a fluid transmission device a constant displacement unit having a pair of synchronously rotatable outer and intermediate elements, a variable displacement unit having a pair of synchronously rotatable outer and intermediate elements, said units including a rotatable fluid conducting element, a stationary fluid conducting element and a housing adapted to align the rotational axis of the outer element of the constant displacement unit with the rotational axis of the intermediate element of the variable displacement unit, and coupling means for connecting the outer element of said constant displacement unit with the intermediate element of said variable displacement unit.

15. In a fluid transmission having a pair of fluid displacement units, a shaft made up of a plurality of elements for conducting fluid between said units including an outer sleeve element, an intermediate sleeve element and a central element shaped and assembled to form an eccentric portion, a pair of oppositely arranged ports in the outer periphery of said eccentric portion associated with one displacement unit, and an annular duct for each of said ports extending axially and into said second displacement unit.

ALFONS H. NEULAND.